United States Patent
Grisnich et al.

(12)

(10) Patent No.: US 6,833,190 B2
(45) Date of Patent: Dec. 21, 2004

(54) PROCESS FOR THE PREPARATION OF A HEAT CURABLE PAINT BINDER COMPOSITION

(75) Inventors: Willem Grisnich, Herxen (NL); Rudolfus Antonius Theodorus Maria Van Benthem, Limbricht (NL); Dirk Muscat, Gangelt Birgden (DE); Jacobus Adriaan Antonius Vermeulen, Geleen (NL)

(73) Assignee: DSM IP Assets B.V., Heerlen (NL)

( * ) Notice: Subject to any disclaimer, the term of this patent is extended or adjusted under 35 U.S.C. 154(b) by 257 days.

(21) Appl. No.: 10/226,248

(22) Filed: Aug. 23, 2002

(65) Prior Publication Data

US 2003/0055182 A1 Mar. 20, 2003

Related U.S. Application Data

(63) Continuation of application No. PCT/NL01/00080, filed on Feb. 2, 2001.

(30) Foreign Application Priority Data

Feb. 24, 2000 (EP) ............................................ 00200652

(51) Int. Cl.$^7$ .............................. B32B 5/16; C08L 61/02
(52) U.S. Cl. ...................... 428/402; 528/335; 528/422; 525/420; 525/424; 525/425; 525/426; 525/427
(58) Field of Search ................................ 528/335, 422; 525/420, 424, 425, 427; 428/402

(56) References Cited

U.S. PATENT DOCUMENTS

| 3,404,869 | A |   | 7/1965 | Harder |   |
|---|---|---|---|---|---|
| 3,286,992 | A |   | 11/1965 | Armeniades et al. |   |
| 3,704,006 | A |   | 11/1972 | Grout et al. |   |
| 4,788,255 | A | * | 11/1988 | Pettit et al. | 525/131 |
| 4,801,680 | A | * | 1/1989 | Geary et al. | 528/272 |
| 4,937,288 | A | * | 6/1990 | Pettit et al. | 525/176 |
| 5,182,337 | A | * | 1/1993 | Pettit et al. | 525/176 |
| 5,830,943 | A | * | 11/1998 | Stanssens | 524/590 |

FOREIGN PATENT DOCUMENTS

| EP | 322834 | 10/1993 |
|---|---|---|
| EP | 371528 | 3/1994 |
| EP | 600546 | 4/1999 |
| EP | 957082 | 11/1999 |
| WO | 99/16810 | 4/1999 |

* cited by examiner

*Primary Examiner*—Samuel A. Acquah
(74) *Attorney, Agent, or Firm*—Mayer, Brown, Rowe & Maw LLP

(57) ABSTRACT

The invention relates to a process for the preparation of a heat curable paint binder composition containing a compound comprising hydroxyalkylamide groups. At first a compound comprising hydroxyalkyl amide units and carboxylic acid units is obtained by reacting a cyclic anhydride and an alkanolamine in a mixing device and that secondly the binder composition is obtained by mixing the compound and a polymer in a second mixing device.

17 Claims, No Drawings

PROCESS FOR THE PREPARATION OF A HEAT CURABLE PAINT BINDER COMPOSITION

CROSS REFERENCE TO RELATED APPLICATIONS

This application is a continuation of International Application No. PCT/NL01/00080, filed Feb. 2, 2001, and which further claims priority from European Application No. 00200652.6, filed Feb. 24, 2000. These applications in their entirety are incorporated herein by reference.

The invention relates to a process for the preparation of a heat curable paint binder composition containing a compound comprising hydroxyalkylamide groups. The invention further relates to a paint composition comprising such a binder composition, a coating and a coated substrate.

The use of a compound comprising hydroxyalkylamide groups in a powder paint binder composition is disclosed in, for example, WO 99/16810. This publication discloses a polymer containing ester groups and at least one amidegroup in the backbone, having hydroxyalkylamide end groups and having a weight average molecular mass of ≧800 g/mol. Said polymer can, for example, be obtained by reaction in a polycondensation reactor of a cyclic anhydride and an alkanolamine after which the compound comprising hydroxylamide groups, being a polyesteramide, is obtained through polycondensation.

Also EP-A-0.322.834 discloses a powder paint binder composition comprising a compound containing a hydroxylamide group as a crosslinker. This compound is obtained by reaction of the dimethyl ester of adipic acid and diethanolamine after which the reaction mixture is heated and methanol has to be removed by destination or fractionation.

It is a disadvantage of the process according to WO 99/16810 (and also of EP-A-0.322.834) that the process for the preparation of the compound comprising hydroxyl amide groups consists of two unit operations. First the raw materials have to be contacted with each other, heated when desired. Secondly the mixture is heated to form a polymer through polycondensation whereby volatile condensation products, for example water or methanol, have to be removed by distillation. Such a compound was used in a paint binder composition, by mixing and extruding of the compound with a polymer.

For a long time intensive efforts have been made to develop crosslinkers and polymers for thermosetting powder paint compositions which have to be cured to obtain powder coatings. Attempts are still being made to find binder compositions for thermosetting powder paints with a good flow behaviour, good storage stability and a good reactivity. A thermosetting powder paint binder composition generally contains more than 50 wt.% polymer and less than 50 wt.% crosslinker. A coating that is ultimately obtained with a powder paint must meet many varying requirements. Various systems are known. Some systems release volatile components during the curing. These systems present the drawback that they form coatings with bubbles and/or that undesirable emissions are released. As far as the latter is concerned, the volatile component, if organic in origin, may cause undesirable environmental or health problems. It has moreover been found that all the desired properties of the powder paint or powder coating are not always realized.

In other systems use is made of polyesters and crosslinkers containing an epoxy group. No volatile components are generally released from these systems. However, the use of bisphenol-A-epoxy resins in the so-called hybrid systems results in coatings that exhibit a relatively great extent of yellowing and powdering when exposed to UV light, while the frequently used triglycidyl-isocyanurate (TGIC) crosslinker is toxicologically suspect.

With respect to the crosslinkers there is a continuous effort to provide economic processes for the preparation of useful crosslinkers which result in required properties of the powder paint and powder coating such as for example non-reactivity, powder stability, good mechanical properties, high weatherability and a high blister limit. Blistering is the formation of dome-shaped, liquid or gas-filled projections in a film resulting from local loss of adhesion and lifting of the film from the underlying surface or coating. The blister limit is the maximum thickness of the film which does not contain blisters.

It is the object of the present invention to provide an improved economical process for the preparation of a heat curable paint composition containing a compound comprising hydroxyl amide units.

The process according to the invention is characterised in that at first a compound comprising hydroxyalkyl amide units and carboxylic acid units is obtained by reacting a cyclic anhydride and an alkanolamine in a mixing device and that secondly a binder composition is obtained by mixing the compound and a polymer in a second mixing device.

During the curing process of a powder paint system comprising a hydroxyalkylamide crosslinker and a polymer containing carboxylic acid groups, water is released during the film formation. This phenonenon may lead to a low blister limit (<100 μm). If the crosslinker contains also carboxylic acid groups, as in the present invention, the extra release of reaction water as a result of the reaction between the reactive groups of the crosslinker itself has to be taken into account. Therefore, a low blister limit could be expected in compositions in which the total amount of carboxylic acid groups in the binder system is selected close to the total amount of hydroxyalkylamide groups in the binder system.

The product obtained with the process according to the invention contains both hydroxyalkylamide groups and carboxylic acid groups. Suprisingly, a powder paint composition comprising this compound results in a high blister limit (>120 μm).

The mixture after the first mixing step generally consists of bis(hydroxylamide) functional carboxylic acids, alkanolamine salts thereof and oligomers comprising ester and amide bonds. This mixture generally has a weight average molecular weight between 100 and 1000, and preferably between 200 and 800. The resulting compound may comprise less than 30% by weight of oligomers having ester and amide bonds and having a weight average molecular weight between 100 and 1000.

According to a preferred embodiment of the invention the compound comprising hydroxyalkylamide units and carboxylic acid units has a weight average molecular weight less than 800.

The process in the first step may be carried out, for example, by a batch process or by a continuous process. The batch reaction may be carried out, for example, in a stirred tank or in an extruder. The continuous reaction may be carried out, for example, in a continuous stirred tank (CSTR), in a dynamic mixer, in a static mixer, in a tube reactor, in an extruder or in a heat exchanger.

According to a preferred embodiment of the invention the process in the first step is a continuous process in a dynamic mixer, in a static mixer or in a tube reactor.

The cyclic anhydride and the alkanolamine are mixed together at a temperature between for example 20° C. and 150° C. Preferably, at least one of these raw materials is a liquid or has been pre-heated to a liquid form before mixing. More preferably, both raw materials are liquids or have been pre-heated to a liquid form, separately and optionally at different temperatures before mixing. These temperatures may range for example for the alkanolamine between 20° C. and 50° C. and for the anhydride between 40° C. and 150° C.

The cyclic anhydride and the alkanolamine may be mixed in a molar ratio of between about 3:1 and 1:2 and preferably between 1:1 and 2:3. As a result of the reaction between the anhydride and the alkanolamine, hydroxyalkylamide groups and carboxylic acid groups are obtained. The amounts of hydroxyalkylamide groups and carboxylic acid groups per unit weight of product are dependent on the selected anhydride and alkanolamine and on their ratio.

The hydroxyalkylamide groups may be present in amounts of between about 1 and 20 meq/g of product and preferably between 4 and 8 meq/g of product.

The carboxylic acid groups may be present in amounts of between 1 and 6 meq/g of product and preferably between 2 and 4 meq/g of product.

In contrast to the process according to WO 99/16810 the present process does not require polycondensation after the reaction in the first step and therefore the removal of volatile products is not necessary.

In general there is a pressure drop over the mixing device. So a pressure is applied to feed the mixing equipment. The pressure is not critical and may range between for example vacuum to higher than 10 MPa. The pressure is usually higher than 0.11 MPa and lower than 5 MPa. Preferably, this pressure is between 0.2 and 1 MPa.

In general a mixer that is suitable for the process according to the invention is of such a design that the liquid components substantially pass through the mixer in plug flow.

By preference the mixer is of such a design that—with application of the process according to the invention—the residence time distribution and the flow-through rate (mean residence time) are short.

The mean residence time and the residence time distribution can for example be measured by means of tracers. See for this for instance: Perry, Chem. Eng. Handbook, 5th ed., McGraw-Hill, pp. 4–27.

Exemplary means for achieving a homogeneous composition in the process of the present invention are static or dynamic mixers with a short residence time distribution and mean residence time.

Preferably a static mixer is used. A static mixer requires little maintenance and is hardly subject to wear and a static mixer can handle much material in a short time. Very suitable static mixers are for example a Kenics type mixer, a Sulzer mixer (SMX, SMXL or a SMR) and static mixers of Toray, Erestat, Wymbs Eng. Ltd., Premixer Quarto, Premixer, Ross ISG, Komax, Lightnin, Prematechnik and Bran und Lübbe. A Sulzer SMR-type mixer can be heated or cooled easily if needed.

Kenics type static mixers are described in U.S. Pat. Nos. 3,286,992, 3,664,638 and 3,704,006, the disclosures of which are incorporated herein by reference. Other mixers are described in U.S. Pat. No. 3,404,869, the disclosure of which is incorporated herein by reference.

Suitable dynamic mixers include for example a rotor/stator type mixer and a colloid mill.

In the present process, after mixing, the compound is cooled. The compound can be fed through piping onto a cooling device. Cooling devices include a cooling belt whereon the compound is fed in a thin layer in order of several millimeters. The thin layer can be obtained by using a resin feeder. The compound can also be applied in droplet form to the cooling belt. It is also possible to feed the mixture onto the belt in a thick layer, and spreading the mixture by means such as for example a doctor blade or by roll which may be cooled, if desired.

The compound in the first step may be obtained as a glassy material or highly viscous compound at room temperature depending on the selection and the ratio of the raw materials. Preferably, the compound is obtained as glassy material at a temperature of about 20° C. More preferably, the compound is a glassy compound at a temperature of higher than 30° C. Preferably in the process according to the invention there is no need to remove condensation water however it is possible to remove water from the reaction mixture in the mixing device so as to obtain a compound that is glassy at a temperature higher than 30° C. as long as the weight average molecular mass of the compound is less than about 800.

The cyclic anhydride may be an anhydride according to formula (I):

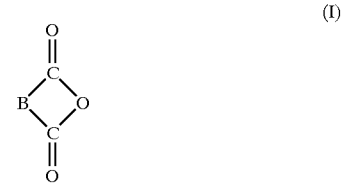

(I)

in which B=($C_2$–$C_{24}$), optionally substituted, aryl or (cyclo) alkyl aliphatic diradical.

Examples of suitable cyclic anhydrides include phthalic anhydride, tetrahydrophthalic anhydride, naphtalenic dicarboxylic anhydride, hexahydrophthalic anhydride, 5-norbornene-2,3-dicarboxylic anhydride, norbornene-2,3-dicarboxylic anhydride, naphtalenic dicarboxylic anhydride, 2-dodecene-1-yl-succinic anhydride, maleic anhydride, (methyl)succinic anhydride, glutaric anhydride, 4-methylphthalic anhydride, 4-methylhexahydrophthalic anhydride, 4-methyltetrahydrophthalic anhydride and/or the maleinised alkylester of an unsaturated fatty acid.

Preferably phthalic acid anhydride and/or hexahydrophthalic anhydride are applied. Most preferably phthalic anhydride is applied.

The alkanolamine may be an alkanolamine according to formula (II):

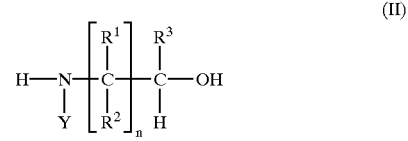

(II)

in which:

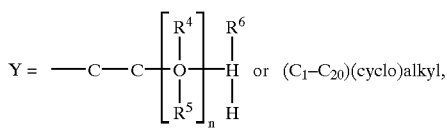

$R^1$, $R^2$, $R^3$, $R^4$, $R^5$ and $R^6$ may, independently of one another, be the same or different, H, $(C_6–C_{10})$ aryl or $(C_1–C_8)$(cyclo)alkyl radical or $CH_2OH$ and n=1–4. More preferably n=1. The alkanolamine may be a monoalkanolamine, a dialkanolamine, a trialkanolamine or a mixture hereof.

The monoalkanolamine may be a mono-β-alkanolamine. Examples of suitable mono-β-alkanolamines include ethanolamine, 1-methyl ethanolamine, 1-ethyl ethanolamine, n-butyl ethanolamine, 1-methyl isopropanolamine, 1-ethyl isopropanol amine, isobutanolamine, β-cyclohexanolamine, n-butyl isopropanolamine and/or n-propanolamine.

The dialkanolamine may be a di-β-alkanolamine. Examples of suitable di-β-alkanolamines are diethanolamine, 3-amino-1,2-propanediol, 2-amino-1,3-propanediol diisobutanolamine (bis-2-hydroxy-1-butyl) amine), di-β-cyclohexanolamine and/or diisopropanolamine (bis-2-hydroxy-1-propyl)amine).

A suitable trialkanolamine is, for example, tris(hydroxymethyl)aminomethane.

Most preferable diisopropanolamine and diethanolamine are applied. The use of diethanolamine results in a powder paint binder composition having a high reactivity and good properties and the use of diisopropanolamine results in good flow properties, a good colour and in a good resistance to hydrolysis.

In the second step the compound obtained in the first step is mixed with a polymer in a mixing device to obtain the binder composition. This mixing device is preferably an extruder.

According to a preferred embodiment of the invention the mixing device of both the first step and the second step is an extruder. More preferably the first step and the second step are conducted simultaneously in the same extruder.

The object of the invention can also be reached by first combining either the cyclic anhydride with the polymer or the alkanolamine with the polymer and secondly combining the resultant mixture with the other component: either the alkanolamine or the cyclic anhydride respectively.

The polymer is preferably a polymer containing carboxyl groups or containing anhydride groups. A polyester, a polyacrylate, a polyether (for example a polyether based on bisphenol or a phenol-aldehyde novolak), a polyurethane, a polycarbonate, a trifluoroethylene copolymer or a pentafluoropropylene copolymer, a polybutadiene, a polystyrene or a styrene maleic anhydride copolymer can for example be selected as the polymer. Generally, polymers having an acid value higher than 40 mg KOH/gram resins are applied because they result in optimal curing characteristics.

Preferably the polymer is a polyester. Polyesters are generally based on the residues of aliphatic polyalcohols and polycarboxylic acids.

The polycarboxylic acids generally are selected from the group consisting of aromatic and cycloaliphatic polycarboxylic acids because these acids tend to have an increasing effect on the glass temperature, Tg, of the polyester. In particular two-basic acids are used. Examplary polycarboxylic acids are isophthalic acid, terephthalic acid, hexahydro-terephthalic acid, 2,6-naphthalene dicarboxylic acid and 4,4"-oxybisbenzoic acid and, in so far as available, their anhydrides, acid chlorides or lower alkyl esters. An example of a lower akyl ester is the dimethylester of naphthalene dicarboxylic acid.

Although not required, the carboxylic acid component usually comprises at least about 50 mol %, preferably at least about 70 mol %, isophthalic acid and/or terephthalic acid.

Other suitable aromatic cycloaliphatic and/or acyclic polycarboxylic acids useful herein include, for example, 3,6-dichloro phthalic acid, tetrachloro phthalic acid, tetrahydro phthalic acid, hexahydro terephthalic acid, hexachloro endomethylene tetrahydro phthalic acid, phthalic acid, azelaic acid, sebacic acid, decane dicarboxylic acid, adipic acid, succinic acid, trimellitic acid and maleic acid.

Hydroxy carboxylic acids and/or optionally lactones can also be used. Examples are 12-hydroxy stearic acid, hydroxy pivalic acid and ε-caprolactone. Monocarboxylic acids, for example, benzoic acid, tert.-butyl benzoic acid, hexahydro benzoic acid and saturated aliphatic monocarboxylic acids, can, if desired, be used in minor amounts.

Useful polyalcohols, in particular diols, reactable with the carboxylic acids to obtain the polyester include aliphatic diols such as, for example, ethylene glycol, propane-1,2-diol, propane-1,3-diol, butane-1,2-diol, butane-1,4-diol, butane-1,3-diol, 2,2-dimethylpropanediol-1,3 (=neopentyl glycol), hexane-2,5-diol, hexane-1,6-diol, 2,2-bis-(4-hydroxy-cyclohexyl)-propane (hydrogenated bisphenol-A), 1,4-dimethylolcyclohexane, diethylene glycol, dipropylene glycol, 2,2-bis[4(2-hydroxy ethoxy)-phenyl]propane, the hydroxy pivalic ester of neopentyl glycol, butylethylpropane diol and ethylmethylpropane diol.

The heat curable paint binder composition according to the invention can be used as a powder paint binder composition.

According to a preferred embodiment of the invention the compound is obtained as a part of the powder paint binder composition by co-extruding the polymer with carboxylic acid groups.

The preparation of thermosetting powder coatings in general and the chemical reactions for curing powder paints to form cured coatings are described by Misev in Powder Coatings, Chemistry and Technology (1991, John Wiley) on pp. 42–54, pp. 148 and 224–226. A thermosetting binder composition is generally defined as the resinous part of the powder paint consisting of polymer and crosslinker.

A binder composition for powder paints obtained with the process according to the invention results in a combination of highly desirable properties such as for instance good flow behaviour and good resistance to chemicals, desired gloss without bubble formation at the surface up to and including layer thicknesses of at least 120 μm, a high resistance to scratching, good mechanical properties, good powder stability, good weather resistance and good colour stability of the powder coating.

Depending on the final application desired, the crosslinker obtained with the process according to the invention may also be used in combination with another crosslinker, for example triglycidyl isocyanurate (TGIC), polybisphenol-A-epoxides, for example, the various Epikote™ grades from Shell Chemicals, compounds containing (blocked) isocyanate groups, for example the caprolactam-blocked isophorone diisocyanate trimer, crosslinkers containing β-hydroxyalkylamide groups such as for example Primid XL 522™ (Rohm and Haas) and/or polyfunctional oxazolines. The weight ratio between the crosslinkers can be selected depending on the final application.

The crosslinker according to the invention may also be combined with a crosslinker comprising at least one linear or branched aliphatic chain with 5–26 carbon atoms and having an epoxy functionality of more than 1, with the proviso that the epoxy groups are carried on the at least one aliphatic chain (as disclosed in EP-A-0.600.546).

Preferably the molar ratio (X) of hydroxyalkyl amide groups ($A_x$) and the total amount of carboxylic acid groups present in the polymer ($C_p$) and the compound ($C_x$) is between about 0.33 and 3.0 and more preferably between 1.2 and 0.8 ($X=A_x/(C_p+C_x)$).

If so desired, the usual additives can be used together with the binder composition according to the invention in the powder-paint composition according to the invention. Additives are for example pigments, fillers, degassing agents, flow agents and/or stabilizers.

Suitable pigments are for example inorganic pigments, for example titanium dioxide, zinc sulphide, iron oxide and chromium oxide, and/or organic pigments for example azo compounds.

Suitable fillers are for example metal oxides, silicates, carbonates and sulphates.

Primary and/or secondary antioxidants, UV stabilizers for example quinones, (sterically hindered) phenolic compounds, phosphonites, phosphites, thioethers and HALS compounds (hindered amine light stabilizers) can for example be used as stabilizers.

Examples of degassing agents are benzoin and cyclohexane dimethanol bisbenzoate.

The flow agents include for example polyalkylacrylates, fluorohydrocarbons and silicone fluids.

Other suitable additives are for example additives for improving tribocharging, such as sterically hindered tertiary amines that are described in EP-B0.371.528.

Powder paints according to the invention can be applied in the usual manner, for example by electrostatically spraying the powder onto an earthed substrate and curing the coating by exposing it to heat at a suitable temperature for a sufficient length of time. The applied powder can for example be heated in a gas oven, an electric oven or with the aid of infrared radiation.

Thermosetting coatings of powder-paint (coating) compositions intended for industrial applications are described further in a general sense in Powder Coatings, Chemistry and Technology, Misev, pages 141–173 (1991).

Compositions according to the present invention may be used in powder paints for use on, for example, metal, wooden and plastic substrates. Examples are industrial coatings, coatings for machines and tools, household applications and parts of buildings. The coatings are also suitable for use in the automotive industry for coating parts and accessories. As is evident from for example "Resins and curing agents for thermosetting powder coatings" (by Kapilow and Sammel, Vol. 59, July 1987, pp. 39–47, Journal of Coatings Technology), coatings based on a solvent or water are not related to thermosetting powder paints, because powder paints must meet requirements relating to for example the binder's melting point, the rheological properties, the reactivity and the stability, which do not apply to "wet" coatings. Surprisingly the compound comprising hydroxyl amide groups may also be used as a starting compound for solvent- or water-based coatings.

Preferably, the compound is used in a coil coating composition or in a can coating composition.

Coil coatings can be obtained via commonly known processes as for example described in "Coil Coatings" by Joseph E. Gaske (Federation of Societies for Coatings Technology, February 1987, pp. 7–19).

The choice of the curing conditions and additives can be based on the desired peak metal temperature (PMT), the nature and the thickness of the substrate. The curing time generally lies between 20 and 70 seconds at temperatures of between 250° C. and 400° C. and a PMT of between 204° C. and 249° C.

Suitable substrates are for example steel, tin-plated steel and aluminium.

The coil coatings according to the invention are suitable for use as a primer and as a top coat and can for example be used as coatings for household equipment such as, for example, refrigerators, deep-freezers, microwave ovens, ovens and boilers, as coatings for caravans and as coatings for facade cladding.

The systems according to the invention can be used both in pigmented and in unpigmented compositions. The composition according to the invention also yields good results in can coatings whose desired layer thickness is generally thinner and whose curing conditions differ from the conditions in the coil coating preparation.

Can coatings can be obtained via processes as for example described in "Organic Coatings—Science and Technology, Volume 2: Applications, Properties, and Performance" by Z. W. Wicks at al. (Wiley-Intersience, N.Y., 1994, pp. 284–290).

The selection of the curing conditions and additives can be based on the desired application, the nature and the thickness of the substrate. The curing time generally lies between a few seconds and dozens of minutes at temperatures of between 100° C. and 220° C.

Suitable substrates are for example steel, tin-plated steel (electrolytical tin plate), chromium-plated steel (electrolytical chromium-chromium oxide steel) and aluminium.

The coatings according to the invention are suitable for use as interior and as exterior coatings and can for example be used as coatings for beer and beverage cans ("2 and 3 piece"), spray cans, tubes, drums, cigar boxes and fish cans (the so-called "drawn-redrawn (DRD)" and "draw-wall ironed (DWI)" cans). They can be used in both pigmented and unpigmented compositions.

The use of the exterior coating is important primarily from a decorative viewpoint by giving the substrate a saleable appearance. It protects the metal from corrosion and the coating also serves as a label.

The interior coating is intended primarily to protect the can's contents from the influences of the metal on the one hand and to protect the metal from the can's contents on the other.

If so desired, the usual additives may be added to the binder system according to the invention, depending on the application, such as for example pigments, fillers, stabilisers, dispersing agents, flow agents and defoaming agents.

What is claimed is:

1. A process for the preparation of a heat curable paint binder composition containing a compound comprising hydroxylamide groups characterised in that at first a compound comprising hydroxyalkyl amide units and carboxylic acid units is obtained by reacting a cyclic anhydride and a alkanolamine in a mixing device and that secondly the binder composition is obtained by mixing the compound and a polymer in a second mixing device.

2. A process according to claim 1 characterised in that the compound comprising hydroxyalkyl amide units and carboxylic acid units has a weight average molecular weight less than 800.

3. A process according to claim 1, wherein the mixing device in the first step is a continuous stirred tank, a dynamic mixer, a static mixer, a tube reactor, an extruder or a heat exchanger.

4. A process according to claim 1, wherein the first step and the second step are conducted simultaneously in the same extruder.

5. A process according to claim 1, wherein the first step the cyclic anhydride and the alkanolamine are mixed together at a temperature between 20° C. and 150° C. and at least one of these raw materials is a liquid or has been pre-heated to a liquid form before mixing.

6. A process according to claim 1, wherein the raw materials in the first step are liquids or have been pre-heated to a liquid form.

7. A process according to claim 1, wherein the cyclic anhydride is phthalic acid anhydride or hexahydrophthalic anhydride and the alkanolamine is diisopropanolamine or diethanolamine.

8. A process according to claim 1, wherein the mixing device in the first step is an extruder and the mixing device in the second step is an extruder.

9. A process according to claim 1, wherein the polymer is a polymer containing carboxyl groups.

10. A process according to claim 1, wherein the molar ratio of hydroxyalkyl amide groups and the total amount of carboxylic acid groups present in the polymer and the compound is between 0.33 and 3.0.

11. A process according to claim 1, wherein the heat curable paint binder composition is a powder paint binder composition.

12. A powder paint composition comprising a binder composition according to claim 11.

13. A powder coating obtained by curing of a powder paint composition according to claim 12.

14. A process according to claim 1, wherein the heat curable paint composition is a binder composition for a coil coating composition or for a can coating composition.

15. A paint composition comprising a binder composition obtained with the process according to claim 14.

16. A coating obtained by curing of a paint according to claim 15.

17. An entirely or partly coated substrate, wherein a coating according to claim 13 is used as the coating.

* * * * *